Nov. 8, 1938.    W. D. FOSTER    2,135,500
FILM HANDLING APPARATUS
Original Filed May 26, 1932    2 Sheets-Sheet 1
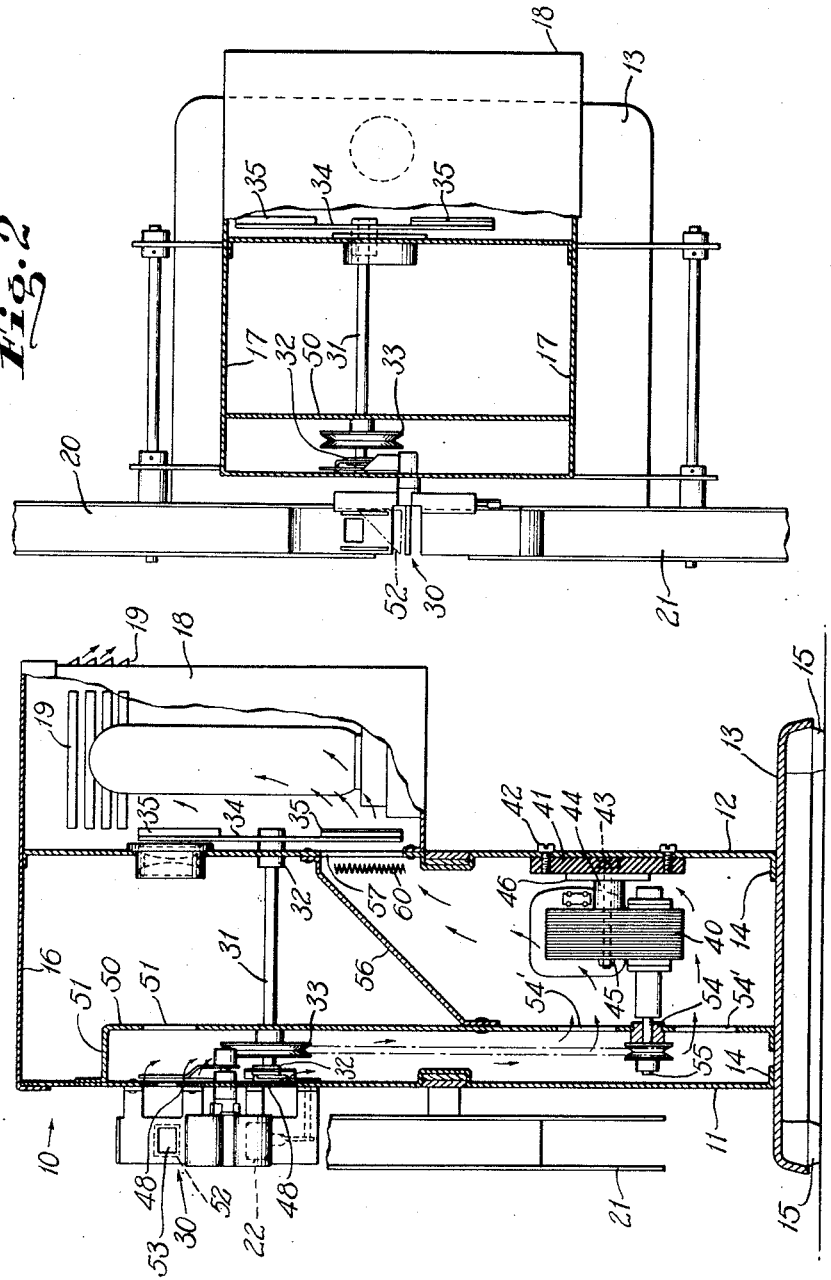
INVENTOR
Warren D. Foster Nov. 8, 1938.  W. D. FOSTER  2,135,500

FILM HANDLING APPARATUS

Original Filed May 26, 1932  2 Sheets-Sheet 2

INVENTOR

Warren D. Foster

Patented Nov. 8, 1938

2,135,500

UNITED STATES PATENT OFFICE 2,135,500

FILM HANDLING APPARATUS

Warren Dunham Foster, Washington Township, Bergen County, N. J., assignor to Kinatome Patents Corporation, Ridgewood, N. J., a corporation of New York Original application May 26, 1932, Serial No. 613,663. Patent No. 1,944,029, dated January 16, 1934. Divided and this application January 15, 1934, Serial No. 706,767

20 Claims. (Cl. 88—17)

This invention relates generally to film handling apparatus and more particularly to cinematographic apparatus such as motion picture projectors and printers, whether for the projection of or exposure to visible images alone, or images representing sound.

This application is a division of my copending application Serial Number 613,663, filed May 26, 1932, and maturing upon January 16, 1934, as Patent Number 1,944,029.

In my parent application, there is disclosed and claimed a motion picture apparatus having among numerous other features a gate structure which is operable to provide a direct rewinding path for the film and means operable upon the movement of a movable gate section to rewinding position for disconnecting one reel from a source of power and concomitantly connecting the other or rewinding reel to the source of power. Other features shown and disclosed in my parent application relate to improved means for protecting the film from the heat of the lamp when the film is stationary in the gate, and for illuminating the gate during the film threading or rewinding operation by light from the main light source without objectionably blinding the operator.

In the present application means are disclosed and claimed for cooling the lamp, the motor and the gate by the same air currents, and also an improved structural arrangement of the parts of the apparatus.

It is an object of the present invention to provide improved means for cooling the lamp of a motion picture apparatus. Another object of the present invention is to provide lamp cooling means in a motion picture apparatus which are also effective for reducing the heating effect of the lamp on other parts of the apparatus.

Still another object of the present invention is to provide means for mounting a combined shutter and cooling fan so as to be effective for preventing a large proportion of the heat of the lamp reaching and heating the other parts of the apparatus such as usual condensing lens which it is undesirable to have heated.

I have discovered that the usual method and means of cooling a lamp of a motion picture apparatus by moving cool air against the lamp, produces undesirable results such as causing undesired variations in the brilliancy of the lamp, and shortening the life of the filaments.

The above noted variations in the brilliancy of a lamp of motion picture apparatus is especially objectionable in printers where accurate control of lamp brilliancy is highly important. It is a feature of my invention to provide improved means for cooling the lamp without producing the above noted undesirable results. According to this feature, I provide means for warming the air moved by a fan toward an electric lamp by resistance elements heated by the same electric current which heats the lamp. Thus, if I use a low voltage lamp, the resistance therefor heats the air which cools the lamp, and the air passed through the resistance reduces the temperature thereof. If I did not cool the resistance, a much larger amount would be required. Thus I accomplish two results by this feature of the invention. These air currents are preferably heated just enough to assure that all of the cooling air reaching the lamp will be substantially uniform in temperature and sufficiently warm not to cause color fluctuation, or shock to the filaments.

It is well understood by those skilled in the art that the heat of the brilliant light of a motion picture apparatus quickly affects any part of the apparatus it reaches especially if such part is made of metal. In view of this condition, I make use of the fact that the shutter blades revolving across the light path intercept or block the light and hence the heat of the lamp for a considerable portion of the total time the lamp is burning. Thus a great deal of the heat of the lamp is absorbed or stopped by the shutter blades before this heat has a chance to reach some stationary or film contacting part of the apparatus. Since these shutter blades are revolving very fast their contact with the air is effective to dissipate or throw off the heat much faster than if the same heat had reached some stationary part of the apparatus and was dissipated by convection and conduction in the usual way. Furthermore, the blades of my shutter are formed with fan elements which greatly increase the efficiency of the air to remove the heat received by these shutter blades from the lamp. Moreover, I arrange this combined fan and shutter much closer to the lamp than has previously been done, so far as I am aware. Thus I stop the maximum amount of heat as close to the source thereof as possible. It will thus be seen that my arrangement of the combined shutter and fan in close relation to the lamp is very advantageous in reducing the heat from the lamp without decreasing the efficiency of the lamp.

I also secure additional advantages by arranging my combined fan and shutter in close proximity to the condensing lens and by positioning the combined fan and shutter between the lamp and the condensing lens. By this arrangement, the portion of the light which is arrested and dissipated by the shutter blades never reaches the condensing lens to heat it objectionably. Furthermore, the action of the fan elements of the shutter causes air currents around the condensing lens and cools it further.

Another feature of my invention resides in the provision for cooling the gate structure which is sometimes objectionably heated by the heat of the usual light from the lamp. According to this feature of my invention, air currents are moved about the gate by the same fan devices which cool the lamp, these air currents being so moved as to reach the gate before they are heated for the reasons noted above in connection with the cooling of the lamp.

It will also be noted that the same air currents which cool the gate and lamp cool the motor.

It is another and important object of my invention to provide an improved structure, or arrangement of parts, for a motion picture apparatus, either per se, or in combination with the elements noted above.

The accompanying drawings, which constitute a part of this specification, disclose certain forms of my invention for illustrative purposes only. It will be understood that the various features of my invention may be embodied in other forms differing from those described and shown herein without departing from the spirit of my invention or the scope of my broader claims.

In the drawings:

Figure 1 is a side view, broken away in part, of a motion picture projector embodying one form of my invention.

Figure 2 is a partial top view of the structure shown in Figure 1, partly in section.

Figure 3:
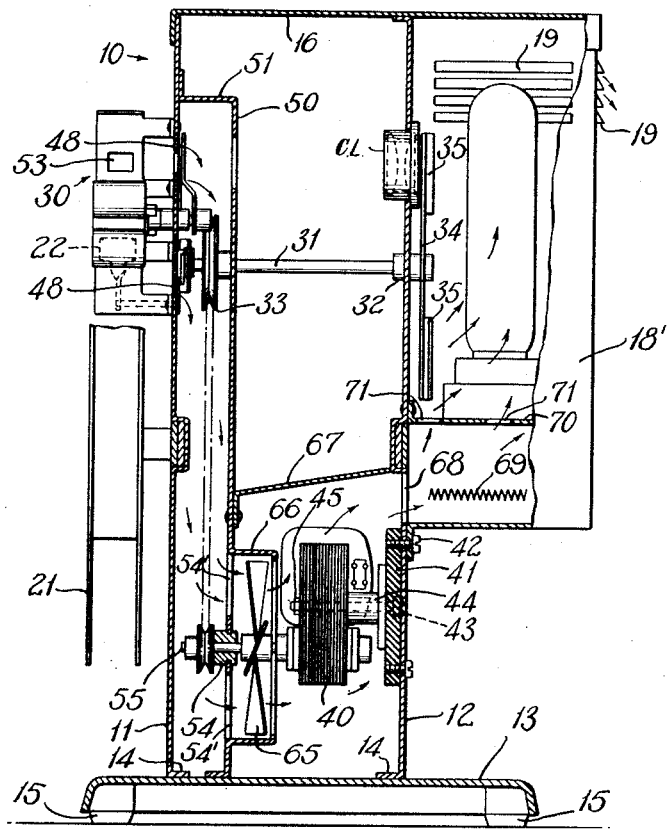
Figure 3 is a view similar to Figure 1 showing another embodiment of my invention.

In carrying out my invention, I prefer to mount the apparatus on a frame generally designated as 10, which may include a front mounting plate 11 and a rear mounting plate 12 spaced away from the front plate. The frame 10 may rest on a base 13 and be fastened thereto in any suitable way as by having the plates 11 and 12 formed with inturned flange members 14 which may be fastened to the base 13 in any well known way. The base may rest on usual soft feet 15 and in some cases for reducing the manufacturing cost and weight the base 13 and feet 15 may be omitted and the flanges 14 may be turned outwardly and made long enough to serve as a base for the frame 10. The opening between the top edges of the plates 11 and 12 is preferably closed by a suitable cover plate 16 and the openings between the side edges of the plates 11 and 12 may be closed by suitable wall members 17 and thus form a closed housing for most of the apparatus.

A housing 18 for a lamp L may be mounted on the rear plate 12 and have louvre openings 19 of a well known kind for permitting the heated air in the housing to escape. The housing 18 is preferably mounted adjacent the top of the housing described above but it will be understood as the description proceeds that this lamp housing may be mounted lower on the other housing if desired. A condensing lens CL is mounted on the rear wall 12 for cooperation with the rear lamp L and the shutter 34.

For cooperation with film supporting members 20 and 21 and film feeding means 22 which may be constructed as described in my parent application, a gate generally designated as 30 may be mounted on the front plate 11 adjacent a cross shaft 31 which may be journaled in suitable bearings 32 carried by the front and rear plates 11 and 12. The rear end of the shaft 31 extends into the lamp housing 20. A pulley 33 may be mounted on the shaft 31 for a belt connection with a source of power to be presently described.

A shutter 34 is mounted on the rear end of the shaft 31 adjacent the rear plate 12 and the shutter blades are preferably formed with integral fan elements 35 for blowing air rearwardly around the lamp L and upwardly through the louvre openings 19.

For driving the shutter 34 and other operable parts of the apparatus there is provided a motor 40, preferably mounted on the rear plate 12 by the following described devices. A fibre plate 41 may be fastened by screws 42 to the rear plate 12 and screws 43 which have their heads countersunk in the fibre plate, may extend through mounting blocks 44 of the motor 40 and the frame of the motor, and nuts 45 may be secured on the end of the screws 43 to hold the mounting blocks 44 tightly against a metal bearing plate 46 interposed between the blocks 44 and the fibre plate 41. This construction is according to that described and claimed in Patent Number 1,932,421 to Ponting and Ford dated October 31, 1933. The motor shown in Figure 1 is an induction type motor of well known construction, but other types of motors may be used and mounted by means similar to that described above for permitting free circulation of cooling air therearound and for securing quiet operation.

For providing cooling means for the gate structure 30, a plurality of small apertures 48 may be made in the front plate 11 adjacent the gate 30. An air deflecting wall 50 may be mounted at the rear of the front wall 11 and a cover member 51 may join the top of the wall 50 to the front plate 11 as shown in Figure 1. This wall 50 may extend downwardly to the base 13, and the shaft 31 extend through a suitable opening in the wall 50. An opening 51' may be provided in the wall 50 for passing light from the lamp L to a prism 52 mounted on the gate 30 for deflecting light from the lamp L through an aperture 53 in the gate, as described in my parent application. It will be noted that the air set in motion about the gate 30 by the fan also cools the prisms 52 mounted on the gate. Adjacent the base 13 a bearing 54 is mounted in the wall 50 for the shaft 55 of the motor 40. Around the bearing 54 there are provided openings 54' through which air may pass.

It will be noted that by the above described construction an air tunnel or duct is provided from a point adjacent the gate 30 to a point adjacent the motor 40.

A deflector plate 56 is mounted in the apparatus as shown in Figure 1 between the wall 50 and the rear plate 12 and is inclined upwardly toward the rear of the frame. It will be noted that the upper end of the deflector plate 56 is disposed above the lower end of the lamp housing 18. An opening 57 is provided between the lamp housing and the upper end of the compartment formed in part by the deflector plate 56, the rear plate 12, and the wall 50. It will be understood that should the lamp housing 18 be spaced away from the rear plate member 12, suitable means will connect the opening 57 and an opening in such spaced lamp housing to provide a passageway for the air from the main housing for the apparatus to the lamp housing. Disposed in front of the opening 57 i. e. on the side toward the wall 50, is a resistance 60 which may be connected in series with the circuit of the lamp in a well known way and be mounted in a suitable way on the rear plate 12 and insulated therefrom. This resistance may be used to lower the voltage of the lamp, as is common in this art.

As the fan elements 35 are driven by the motor 40, air will be forced rearwardly from the fan plate and will be sucked into the lamp housing through the opening 57 and around the resistance 60. Thus it will be seen that the air reaching the lamp housing may be prewarmed to such an extent that it will not suddenly chill the lamp L but will be enough cooler than the lamp to carry off a certain amount of the heat generated by the lamp and prevent it from overheating other parts of the apparatus. As indicated by the arrows, the air which is drawn through the opening 57 into the lamp housing passes inwardly around the gate 30 and into the tunnel between the deflector wall 50 and the front mounting plate 11 and is thence drawn downwardly until it reaches the openings 54' through which it passes into the compartment enclosing the resistance and the motor 40. It will be readily seen by those skilled in air moving devices that currents of air will be produced around the motor 40 and be very advantageous in cooling it. Also, these same currents of air, slightly warmed by contact with the motor, pass upwardly and around the resistance 60 to be additionally warmed as may be needed for the purpose set forth above, and also to cool the resistance.

The form of my invention shown in Figure 3 discloses a fan 65 mounted on the shaft 55 of the motor 40. A suitable housing 66 is provided around the fan in cooperation with the openings 54' through the deflecting wall 50 and makes the fan effective for drawing air through the apertures 48 and causing cooling currents around the gate 30 and the prism 52. These same cooling air currents pass downwardly between the front plate 11 and the deflector wall 50 and are forced rearwardly against and around the motor 40. After leaving the motor, the air currents are deflected by a deflecting plate 67 through an opening 68 in the rear plate 12 and into the lower part of the lamp housing 18'. Inside the housing the air passes through and around resistance 69 suitably mounted in the housing 18' beneath the lamp L which may be mounted on a suitable plate 70 supported in the housing above the base thereof and having perforations 71 through which the prewarmed air currents pass upwardly around the lamp. Thus it can be seen that the fan 65 becomes effective for cooling the gate 30, the prism 52, the motor 40 and the lamp L. As stated above, the air before it reaches the lamp L is preheated to a predetermined extent to prevent the sudden chilling of the lamp and thereby adversely affecting its brilliancy and the life of its filaments.

As has been stated clearly in my parent specification, I may use both the fan 65 and the fan blades 35 in cooperation, or I may depend upon either of these cooling agencies.

Certain of the advantages of my invention will appear from the statements hereinbefore. Other advantages arise from the provision of an inexpensive fan forming an integral portion of the usual shutter and which is so constructed as to permit the shutter to be compactly disposed between the lamp and the condensing lens therefor. Other advantages arise from the provision of improved means for cooling a gate structure by air currents which are subsequently used to cool the lamp of the apparatus. Still other advantages arise from the use of the cooling means provided for cooling the lamp for also cooling a prism which receives and deflects the condensed rays of light from the lamp, thus protecting the prism from being overheated. Still further advantages arise from the provision of an extremely compact and convenient supporting structure for a motion picture apparatus.

I claim:

1. In a film handling apparatus, an electric lamp for passing light to the film for projection purposes, a housing for said lamp having an air inlet, means for varying the amount of electric current delivered to said lamp, said means being characterized by the production of heat, said means being positioned outside of said housing, means for moving air against said means and into the said housing through said inlet and about said lamp whereby said housing is cooled by preheated air, said air forcing means including a shutter fan positioned to intercept a large proportion of the heat rays of said lamp.

2. In a film handling apparatus, in combination, film feeding means, an apertured gate, a driving shaft for said feeding means, an electric motor for revolving said driving shaft, a lamp for cooperation with said gate, a shutter on said shaft for cooperation with said lamp and said gate, said shutter having fan blades formed thereon and being disposed in relatively adjacent relation to said lamp, the fan blades on said shutter being effective for moving air to said lamp for cooling the same, a conduit device extending between said fan and a point adjacent said gate through which device said fan pulls air currents created thereby, said air currents being effective initially to cool said gate and thereafter to pass into cooling relation with said lamp.

3. In a film handling apparatus, a first housing therefor, a gate mounted on a wall of said housing, said housing having perforations in said wall adjacent said gate, a motor for operating said apparatus, a lamp, a housing for said lamp, a passageway for air currents between said gate and said lamp housing, a fan on the shaft of said motor, and means cooperating with said fan for moving air about said gate and through said passageway into said second housing and about said lamp for cooling the same.

4. In a film handling apparatus, a first housing therefor, a gate mounted on a wall of said housing, said housing having perforations in its enclosing wall adjacent said gate, a motor for operating said apparatus, a lamp, a lamp housing supported upon said first housing, a passageway for air currents between said gate and said lamp housing, a fan on the shaft of said motor cooperating with said passageway for moving air about said gate and through said passageway into said lamp housing and about said lamp for cooling the same, and means including resistance in the circuit of said lamp disposed across said passageway for prewarming the air moved by said fan before it reaches said lamp.

5. In a film handling apparatus having means for feeding a film, an electric lamp, a lamp housing, a main housing for said apparatus separate from said lamp housing, said main housing supporting said lamp housing, a shutter, a fan carried by said shutter for operation therewith, means for driving said feeding means and said fan, an opening between said housings, resistance in the circuit of said lamp disposed across said opening for heating the air moved through said opening, said fan being arranged for moving air through said opening and about said lamp.

6. In a film handling apparatus having a feeding means, a first housing for said apparatus, a lamp, a lamp housing supported upon said first housing, a condensing lens for said lamp supported by said first housing, and a shutter mounted for operation between said lens and said lamp, said shutter having blades formed with fan elements effective for cooling said lens and said lamp.

7. In a film handling apparatus having an apertured gate and a source of light cooperating with the aperture of said gate, and means for feeding film past the aperture of said gate, in combination, an upright mounting frame including two spaced plates, a housing for said source of light supported on the outer face of one of said frame plates, an electric motor for driving said feeding means mounted between said plates below said housing, an impeller fan mounted on the shaft of said motor, and means cooperating with said fan for cooling said motor and said lamp housing, said cooling means including an auxiliary housing disposed between said plates and around said motor and said fan, said housing having an air inlet opening opposite said fan for drawing air into said fan from the exterior of said housing, said mounting plate between said auxiliary housing and said lamp housing having air passage-ways, and means for directing air from said fan upwardly against the lower portion of said motor, the continued operation of said fan being effective to force air upwardly past the motor and into said lamp housing, thereby cooling both the motor and the interior of the lamp housing.

8. In a film handling apparatus, two film supporting members, an apertured gate disposed between said members through which a film supported by said members passes, means for feeding the film through said gate past the aperture thereof, an electric lamp for passing light to said aperture, a housing for said lamp having an air inlet, instrumentalities for changing the characteristics of the electric current delivered to said lamp, said instrumentalities being characterized by the production of heat, said instrumentalities being positioned outside of said housing, and means for forcing air against said instrumentalities, into said housing adjacent said inlet, and about said lamp whereby said housing is ventilated by preheated air.

9. In a film handling apparatus, in combination, film feeding means, a driving shaft therefor, an electric motor for revolving said shaft, a lamp for cooperation with said feeding means, a shutter on said shaft for cooperation with said lamp and said feeding means, a fan carried by said shutter for cooling said lamp, and means cooperating with said fan for directing air currents created by said fan around said motor for cooling said motor.

10. In a film handling apparatus, in combination, film feeding means, a gate, a driving shaft for said feeding means, an electric motor for revolving said driving shaft, a lamp for cooperation with said gate, a shutter on said shaft for cooperation with said lamp and said gate, said shutter being disposed in relatively adjacent relation to said lamp and relatively remote relation to said gate, a fan on said shutter for cooling said lamp, and a conduit extending between said fan and said gate through which said fan moves air currents created thereby whereby said gate is cooled.

11. In a film handling apparatus having a housing, a gate having an aperture, a source of light inside said housing positioned in angular relation to the optical axis of said aperture, means outside said housing for deflecting light from said source through said aperture, a condensing lens inside said housing for condensing light from said source upon said light deflecting means, means effective for cooling said light deflecting means, said condensing lens and said light source, said cooling means including air conducting means leading from said light deflecting means to the interior of said housing toward said condensing lens and said light source, a fan for drawing air through said air conducting means and directing it toward said lens and light source, and means for driving said fan.

12. In a motion picture apparatus, an electric lamp, a fan for moving air currents against said lamp, and means heated by the electric current which operates said lamp disposed adjacent said lamp in the path of said air currents moved by said fan against said lamp for pre-warming said air currents before they reach said lamp.

13. In a motion picture apparatus, an electric lamp, a lamp housing, a fan for moving air currents against said lamp, resistance elements heated by electric current, means for disposing said resistance elements outside said housing in the path of the air currents moved by said fan against said lamp for pre-warming said air currents before they reach said lamp.

14. In a film handling apparatus, a gate having an aperture, a source of light positioned in angular relation to the optical axis of said aperture, means for deflecting light from said source through said aperture, a shutter adjacent said light source, said shutter having a fan portion effective for cooling said light source, said shutter being positioned to arrest the passage of a large portion of the heat of said lamp before it reaches said light deflecting means, and means cooperating with said fan portion for reducing the heat from said lamp which passes said shutter and reaches said light deflecting means.

15. In a film handling apparatus, a gate having an aperture, a source of light positioned in angular relation to the optical axis of said aperture, light deflecting means for deflecting light from said source through said aperture, a condensing lens for condensing light from said source upon said prism, means effective for cooling said prism, said condensing lens and said light source, said cooling means including a single fan adjacent said light source and air conducting devices cooperating with said fan for moving cooling currents of air first about said prism, and then about said lens and said light source.

16. In a film handling apparatus, a gate having an aperture, a source of light positioned in angular relation to the optical axis of said aperture, means for deflecting light from said source through said aperture, a condensing lens for condensing light from said source upon said light deflecting means, and means effective for cooling said gate, said light deflecting means, said condensing lens and said light source, said cooling means including a fan effective for setting the air in motion adjacent said light source and said condensing lens and devices cooperating with said fan for setting air in motion adjacent said gate and said light deflecting means, said devices including air conducting means leading from the intake side of said fan to points adjacent said gate and said light deflecting means, and air inlets in said air conducting means positioned so that air moving inwardly through said inlets passes against said gate and said light deflecting means.

17. In a motion picture apparatus, an electric lamp, a fan for moving cooling air currents against said lamp, and means heated by the electric current which operates said lamp, said means being disposed adjacent said lamp in the path of said air currents moved by said fan against said lamp, said means being positioned for encountering said air currents just before they reach said lamp whereby the greater part of the heat transferred to said air currents from said heated means is made effective for preventing material variations in the temperature of said air currents which cool said lamp.

18. In a motion picture apparatus having a casing enclosing operable parts of the apparatus, a source of light inside said casing, film guiding means external to said casing arranged for cooperation with said light source, said guiding means being heated by said light source, means for conducting air from said guiding means toward said light source, a fan so positioned in relation to said conducting means that it draws air from the region of said film guiding means into said casing and through said conducting means and directs it toward said light source, and means for operating said fan.

19. In a film handling apparatus, a gate, a source of electric light positioned in angular relation to the optical axis of said apparatus, means for deflecting light from said source through the aperture of said gate, said deflecting means being located adjacent said gate, a fan for cooling said light source, air conducting means leading from a point adjacent said gate and said light deflecting means to said fan, and means for revolving said fan to draw air through said conducting means from the region about said gate and said light deflecting means thereby cooling said gate and said light deflecting means and to direct said air against said light source thereby cooling said light source with air which has been slightly heated by contact with said gate and light deflecting means.

20. In a film handling apparatus having a housing, a gate outside said housing having an aperture, a source of light inside said housing positioned in angular relation to the optical axis of said aperture, means outside said housing for deflecting light from said source through said aperture, a fan adjacent said light source, air conducting means leading between said fan and a point adjacent said light deflecting means for cooling said light source and said light deflecting means, and means for revolving said fan to draw air through said air conducting means and to direct it toward said lamp.

WARREN DUNHAM FOSTER.